United States Patent
Liang

(10) Patent No.: US 8,494,662 B2
(45) Date of Patent: Jul. 23, 2013

(54) CONTROLLER AND METHOD FOR CONTROLLING ACTUATOR TO DRIVE PLANT

(75) Inventor: Chien-Hao Liang, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 921 days.

(21) Appl. No.: 12/606,266

(22) Filed: Oct. 27, 2009

(65) Prior Publication Data

US 2010/0250002 A1      Sep. 30, 2010

(30) Foreign Application Priority Data

Mar. 26, 2009   (CN) .......................... 2009 1 0301163

(51) Int. Cl.
*G05B 13/02*           (2006.01)
(52) U.S. Cl.
USPC ........................................................... 700/33
(58) Field of Classification Search
USPC .................... 700/28, 32, 33, 40–45; 318/560, 318/563, 609–612, 626, 635
See application file for complete search history.

(56) References Cited

U.S. PATENT DOCUMENTS

| | | | | |
|---|---|---|---|---|
| 5,418,814 A * | 5/1995 | Hulbert | ......................... | 370/342 |
| 6,037,737 A * | 3/2000 | Bupp et al. | ..................... | 318/610 |
| 6,665,651 B2 * | 12/2003 | Young et al. | ..................... | 706/21 |
| 6,856,920 B2 * | 2/2005 | Millott et al. | ................... | 702/56 |
| 8,145,329 B2 * | 3/2012 | Pekar et al. | ..................... | 700/45 |
| 8,200,345 B2 * | 6/2012 | Li et al. | ........................... | 700/38 |
| 2006/0039079 A1 * | 2/2006 | Kobayashi et al. | ......... | 360/78.05 |
| 2006/0095180 A1 * | 5/2006 | Ummethala et al. | ............ | 701/37 |
| 2007/0191967 A1 * | 8/2007 | Yo et al. | ............................ | 700/1 |
| 2007/0252046 A1 * | 11/2007 | Miller et al. | .................. | 244/221 |
| 2008/0237517 A1 * | 10/2008 | Krupadanam | ........... | 251/129.01 |
| 2010/0004829 A1 * | 1/2010 | Tanaka et al. | ................... | 701/48 |

* cited by examiner

*Primary Examiner* — M. N. Von Buhr
(74) *Attorney, Agent, or Firm* — Altis Law Group, Inc.

(57) ABSTRACT

In a controller and method for preventing sending saturated control signals to an actuator, the controller receives parameters of controlling the actuator. The parameters include: a limit capacity value of the actuator, a predefined value which the status value of the plant needs to obtain, a ratio of the ideal control signal value to the limit capacity value, and a ratio of the actual control signal value to the limit capacity value. The controller calculates an ideal control signal value and an actual control signal value by applying a hyperbolic tangent function. And then the controller sends a control signal to the actuator according to the actual control signal value. The actuator drives a plant to move according to the control signal.

14 Claims, 6 Drawing Sheets

CONTROLLER AND METHOD FOR CONTROLLING ACTUATOR TO DRIVE PLANT

BACKGROUND

1. Technical Field

Embodiments of the present disclosure relate to managing actuators, and more particularly to a controller and method for preventing sending saturated control signals to an actuator controlling an actuator to drive a plant.

2. Description of Related Art

In the field of industrial control, if a control signal value exceeds a limit capacity value of an actuator, namely the control signal of the actuator is saturated, the actuator may be damaged. At present, if a ideal control signal value does not exceed the limit capacity value, the ideal control signal value is taken as an actual control signal value. A controller inputs a control signal corresponding to the actual control signal value to the actuator. If the ideal control signal value exceeds the limit capacity value, the limit capacity value is taken as the actual control signal value.

As shown in FIG. 1, a function curve of the ideal control signal values and the actual control signal values forms a beeline. It is well known that it is discontinuity if the beeline is calculated differentially. The discontinuity values results in unstable actual control signal values. The unstable actual control signal values may damage the actuator.

What is needed, therefore, is an improved controller and method for preventing sending saturated control signals to an actuator.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 2:
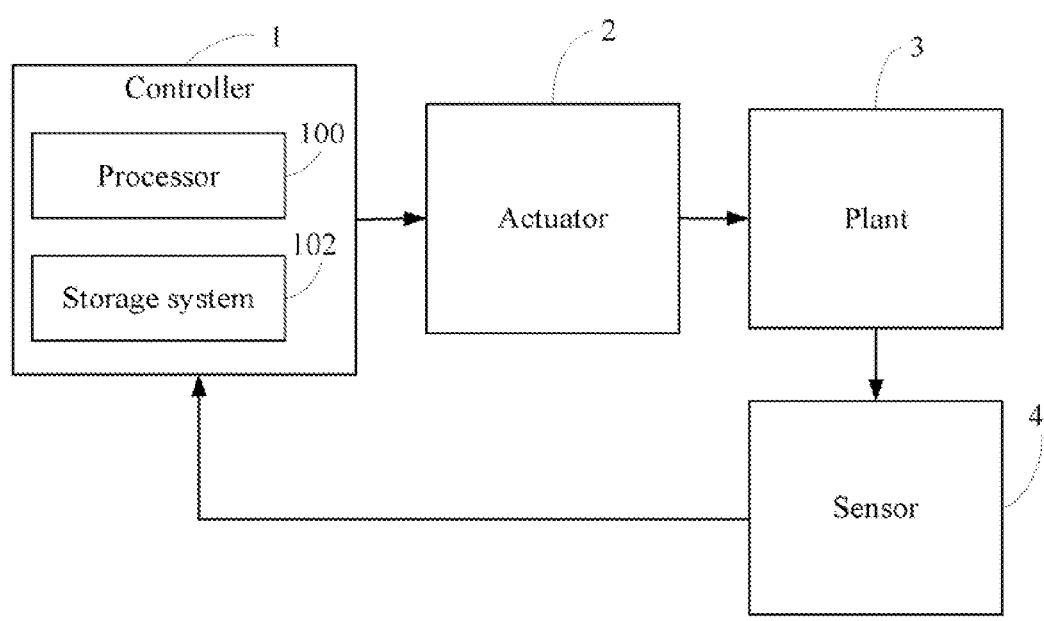
FIG. 2 is a block diagram of one embodiment of a controller.

FIG. 2 is a block diagram of one embodiment of a controller 1. The controller 1 connects to an actuator 2, and is operable to avoid sending saturated control signals to the actuator 2. In one embodiment, the controller 1 may be a proportion differential (PD) controller. The actuator 2 may be a motor, for example. The actuator 2 connects to a plant 3. In one embodiment, the plant 3 may be a gauge head of a measurement machine.

The controller 1 includes a processor 100 and a storage system 102. The processor 100 executes one or more computerized operations of the controller 1 and other applications, to provide the functions of the controller 1. The storage system 102 stores one or more programs and other applications of the controller 1. The storage system 102 also stores arithmetic for calculating control signal values of the actuator 2. In one embodiment, the arithmetic may be proportion integral differential (PID) arithmetic.

A sensor 4 connects with the plant 3 and the controller 1. The sensor 4 obtains a status value of the plant 3 and sends the status value to the controller 1. The controller 1 calculates the difference between the status value and a predefined value set by a user. The controller 1 sends a control signal to the actuator 2 according to the difference. The actuator 2 drives the plant 3 to move according to the control signal. If the difference equals to zero, the actuator 2 stops sending the control signal to the actuator 2. The predefined value "y" is a status value of the plant 3 needs to obtain. In one embodiment, the status value may be a distance that the plant 3 moves. The predefined value "y" may be the target distance the plant 3 should move.

Figure 1:
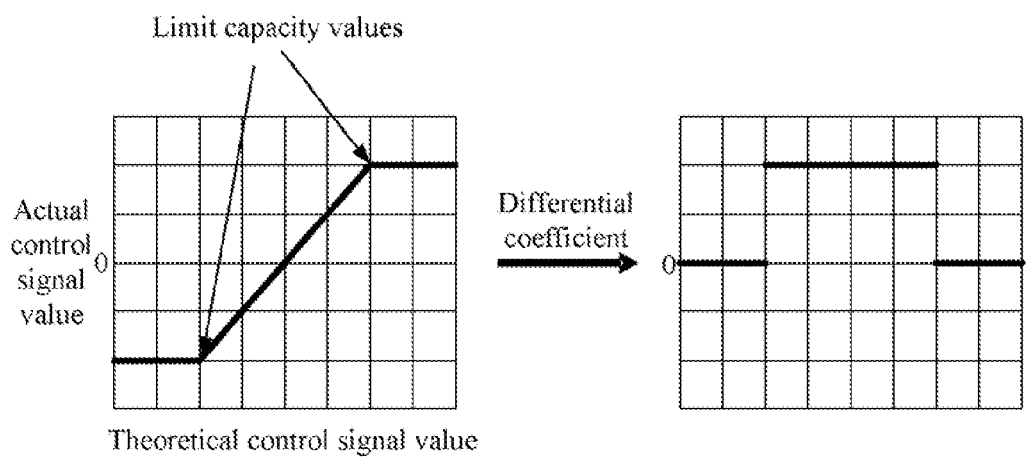
FIG. 1 is a block diagram of common curves of a used controller controlling an actuator to drive a plant.
Figure 3:
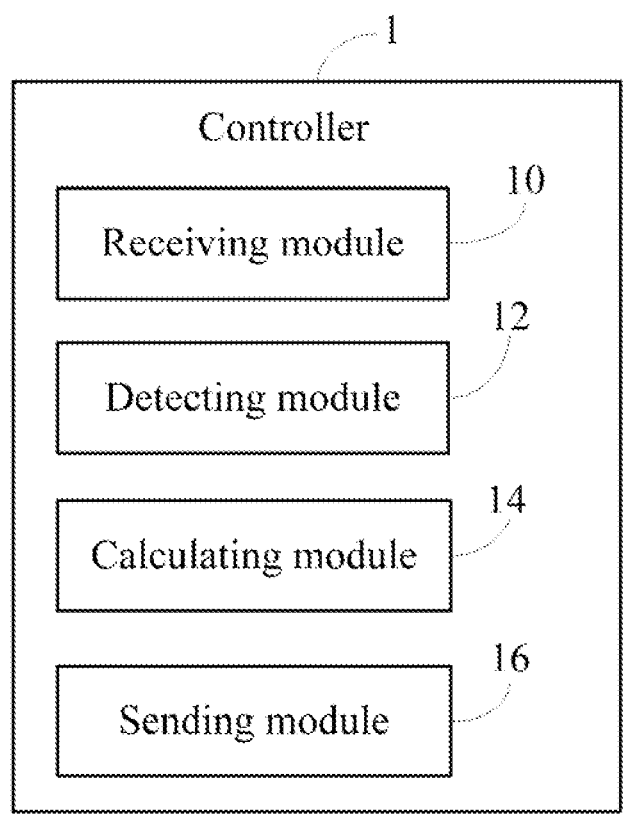
FIG. 3 is a block diagram of functional modules of the controller in FIG. 2.

FIG. 3 is a block diagram of one embodiment of the controller 1 in FIG. 1. In one embodiment, the controller 1 may include a receiving module 10, a detecting module 12, a calculating module 14, and a sending module 16. It may be understood that the processor 100 may be used to execute one or more computerized codes of the functional modules 10, 12, 14, and 16. The one or more computerized codes of the functional modules 10, 12, 14, and 16 may be stored in the storage system 102.

The receiving module 10 receives user input. The user input includes a limit capacity value "max" of the actuator 2, a predefined value "y", a value "ca", and a value "i". The predefined value "y" is a status value of the plant 3 needs to obtain. The value "ca" is a ratio of an ideal control signal value to the limit capacity value "max". The value "i" is a ratio of an actual control signal value to the limit capacity value "max". In one embodiment, 0<i<1. For example, if ca=0.5, i=0.75, and max=1000 by applying, the ideal control signal value is 1000*0.5=500, and the actual control signal value is 1000*0.75=750. The receiving module 10 also receives the status value "x" of the plant 3 from the sensor 4. The user input may be received via soft or hard keyboard of the controller 1, for example.

The detecting module 12 detects if |x−y|=0. If |x−y|=0, namely the status value of the plant 3 reaches the predefined value "y", the controller 1 stops sending the control signal to the actuator 2. If |x−y|≠0, the calculating module 14 calculates the ideal control signal value "co" according to the status value "x" by applying the PID arithmetic.

The calculating module 14 also calculates the actual control signal of the actuator 2 according to the ideal control signal value "co" by applying a formula of. max*tan h(tan h$^{-1}$(i)*co/ca*max). The sending module 16 sends the control signal to the actuator 2 according to the actual control signal value. The actuator 2 drives the plant 3 to move according to the control signal.

Figure 5:
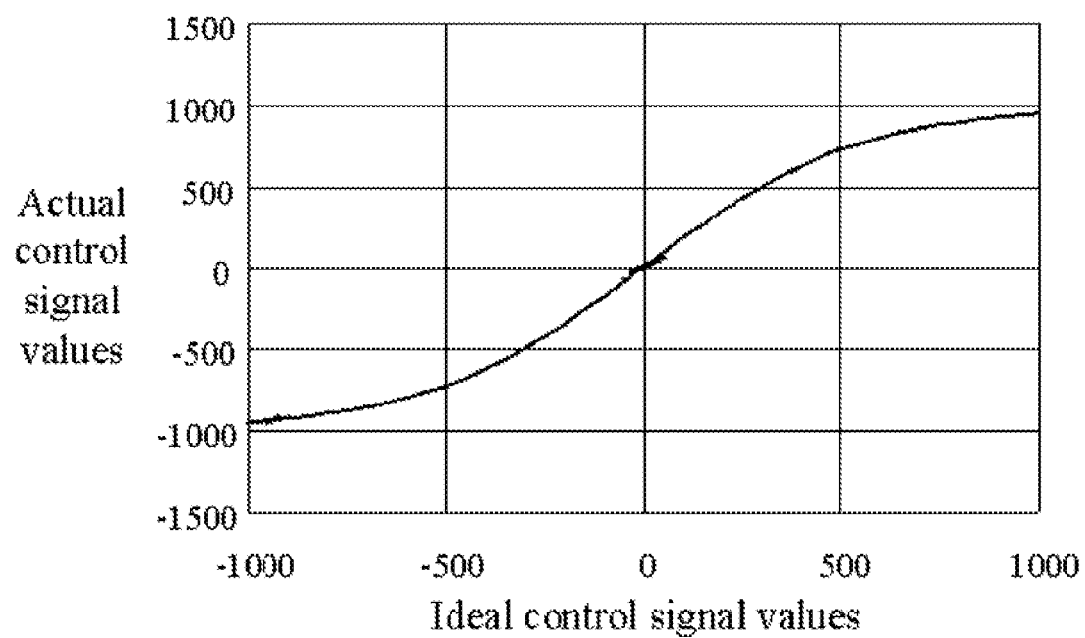
FIG. 5 and FIG. 6 are one embodiment of curves of the controller in FIG. 2.
Figure 6:
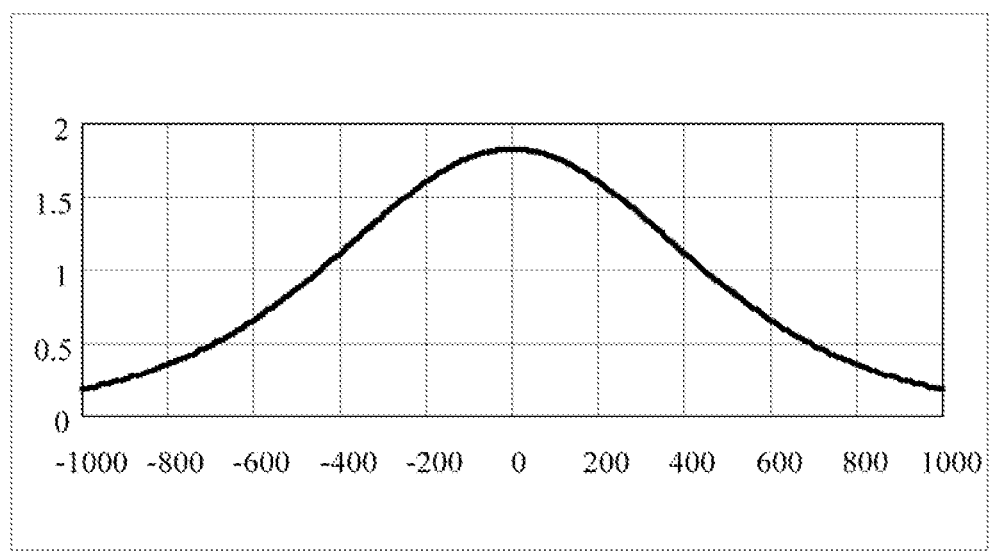

As mentioned above, the actuator 2 may be a motor, where a maximum rotation speed of the motor may be 1000 rotations per hour (r/h). The receiving module 10 receives "ca" and "i" set by the user. For example, the user may set ca=1 and i=0.95. The calculating module 14 calculates the actual control signal value according to the formula of max*tan h(tan h$^{-1}$(i)*co/ca*max). The calculated actual control signal value is [1000*tan h(0.00183*co)]r/h. The control signal value is smaller than the maximum rotation speed of the motor. As shown in FIG. 5, the curve shows the function of the formula. FIG. 6 is a differential curve of the curve in FIG. 5. As shown in FIG. 6, the differential curve is continuous.

Figure 4:
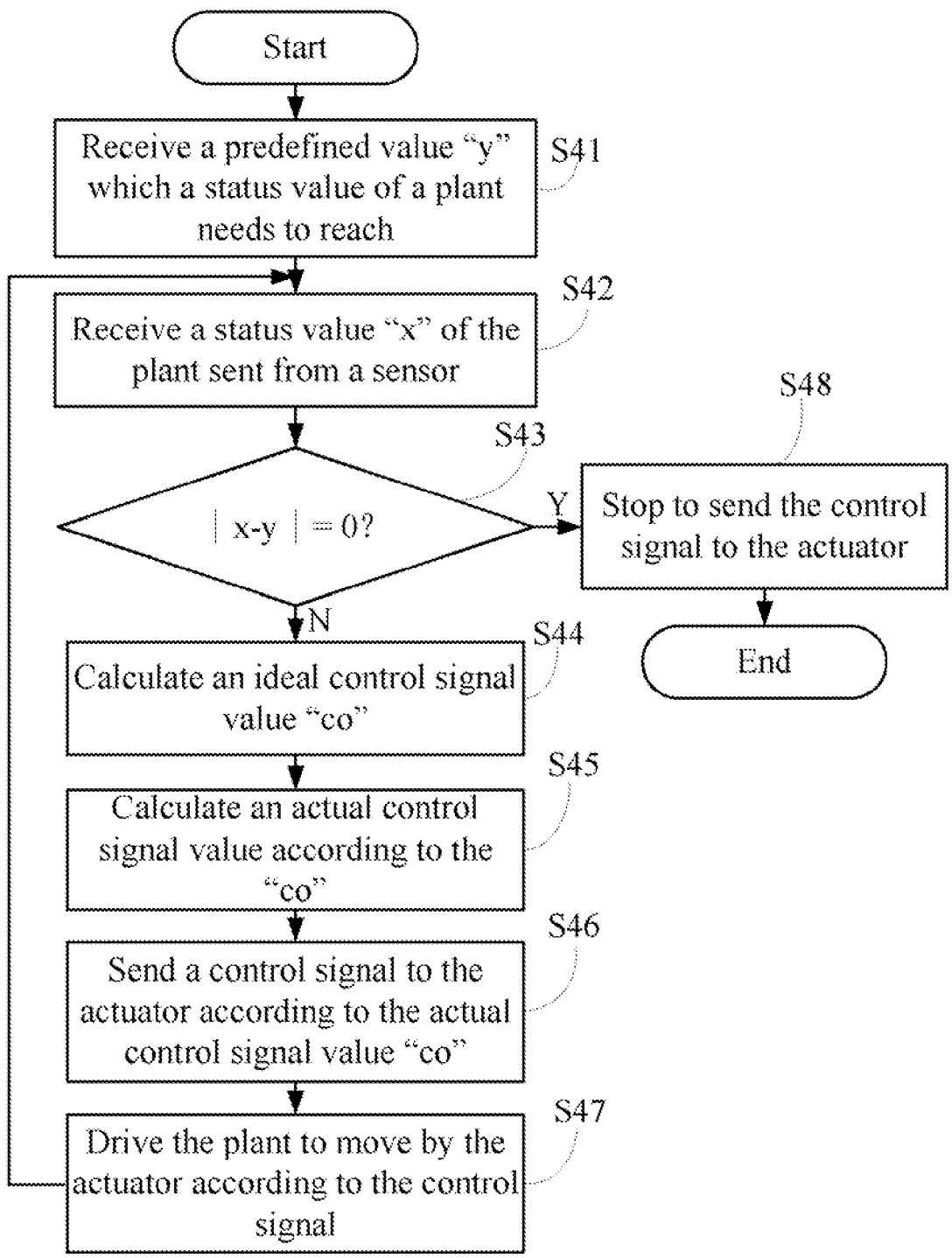
FIG. 4 is a flowchart of one embodiment of a method for controlling an actuator to drive a plant.

FIG. 4 is a flowchart of one embodiment of a method for controlling an actuator to drive a plant. Depending on the embodiment, additional blocks may be added, others removed, and the ordering of the blocks may be changed.

In block S41, the receiving module 10 receives user input. The user input includes a limit capacity value "max" of the actuator 2, a predefined value "y", a value "ca", and a value "i". The predefined value "y" is a status value of the plant 3 needs to obtain. The value "ca" is a ratio of the ideal control signal value to the limit capacity value "max". The value "i" is a ratio of the actual control signal value to the limit capacity value "max".

In block S42, the receiving module 10 receives a status value "x" of the plant 3 from the sensor 4.

In block S43, the detecting module 12 detect if $|x-y|=0$. If $|x-y|=0$, block S48 is implemented. If $|x-y|\neq 0$, block S44 is implemented.

In block S44, the calculating module 14 calculates a ideal control signal value "co" according to the status value "x" by applying the PID arithmetic.

In block S45, the calculating module 14 calculates an actual control signal value according to the ideal control signal value "co" by applying a formula: $\max * \tan h^{-1}(\tan h^{-1}(i) * co/ca * \max)$.

In block S46, the sending module 16 sends a control signal to the actuator 2 according to the actual control signal value.

In block S47, the actuator 2 drives the plant 3 to move according to the control signal, and then block S42 is repeated.

In block S48, the sending module 16 stops sending the control signal to the actuator 2.

The disclosure prevents control signals that the controller 1 sends to the actuator 2 from saturation utilizing character of hyperbolic tangent function. Because that a curve of the hyperbolic tangent function is continuous after being calculated differentially, the actual control signals that the controller 1 sends to the actuator 2 are stable. The stable control signals prevent the actuator 2 from being damaged.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A controller comprising:
   a storage system; and
   at least one processor to execute one or more programs stored in the storage system, the one or more programs comprising:
   a receiving module operable to receive a status value "x" of a plant from a sensor connected to the controller and the plant, a limit capacity value "max" of the actuator, a ratio "ca" of the ideal control signal value to the limit capacity value "max", and a ratio "i" of the actual control signal value to the limit capacity value "max" inputted by a user;
   a calculating module operable to calculate an ideal control signal value of the actuator "co" according to the status value "x", and calculate an actual control signal value of the actuator by a formula of $\max * \tanh(\tanh^{-1}(i) * co/ca * \max)$; and
   a sending module operable to send a control signal to the actuator according to the actual control signal value, so as to control the actuator to drive the plant to move.

2. The controller of claim 1, wherein the receiving module is operable to receive a predefined value "y" which the status value of the plant needs to obtain.

3. The controller of claim 2, further comprising a detecting module operable to detect if $|x-y|=0$, and the sending module is further operable to stop sending the control signal to the actuator if $|x-y|=0$.

4. The controller of claim 1, wherein $0 < i < 1$.

5. The controller of claim 1, the storage system also stores a proportion integral differential (PID) arithmetic for calculating the ideal control signal value.

6. A method for controlling an actuator to drive a plant, the method comprising:
   (a) receiving by a controller a status value "x" of the plant from a sensor, a limit capacity value "max" of the actuator, a ratio "ca" of the ideal control signal value to the limit capacity value "max", and a ratio "i" of the actual control signal value to the limit capacity value "max" input by a user;
   (b) calculating an ideal control signal value of the actuator "co" according to the status value "x";
   (c) calculating an actual control signal value of the actuator according to the ideal control signal value "co" by a formula of $\max * \tanh(\tanh^{-1}(i) * co/ca * \max)$; and
   (d) sending a control signal to the actuator according to the actual control signal value, so as to control the actuator to drive the plant to move according to the control signal.

7. The method of claim 6, before block (a) further comprising:
   receiving a predefined value "y" which the status value of the plant needs to obtain.

8. The method of claim 7, after step (a) further comprising:
   detecting if $|x-y|=0$; and
   stopping sending the control signal to the actuator if $|x-y|=0$.

9. The method of claim 6, wherein the ideal control signal value is calculated by applying a proportion integral differential (PID) arithmetic.

10. The method of claim 6, wherein $0 < i < 1$.

11. A non-transitory computer readable medium having stored therein instructions that, when executed by a controller, causes the controller to perform a method for controlling an actuator to drive a plant, the method comprising:
    (a) receiving by a controller a status value "x" of the plant from a sensor, a limit capacity value "max" of the actuator, a ratio "ca" of the ideal control signal value to the limit capacity value "max", and a ratio "i" of the actual control signal value to the limit capacity value "max" input by a user;
    (b) calculating an ideal control signal value of the actuator "co" according to the status value "x";
    (c) calculating an actual control signal value of the actuator according to the ideal control signal value "co" by a formula of $\max * \tanh(\tanh^{-1}(i) * co/ca * \max)$; and
    (d) sending a control signal to the actuator according to the actual control signal value, so as to control the actuator to drive the plant to move according to the control signal.

12. The non-transitory computer readable medium of claim 11, before step (a) further comprising:
    receiving a predefined value "y" which the status value of the plant needs to obtain.

13. The non-transitory computer readable medium of claim 12, after block (b) further comprising:
    detecting if $|x-y|=0$; and
    stopping sending the control signal to the actuator if $|x-y|=0$.

14. The non-transitory computer readable medium of claim 11, wherein $0 < i < 1$.

* * * * *